Figure 1:
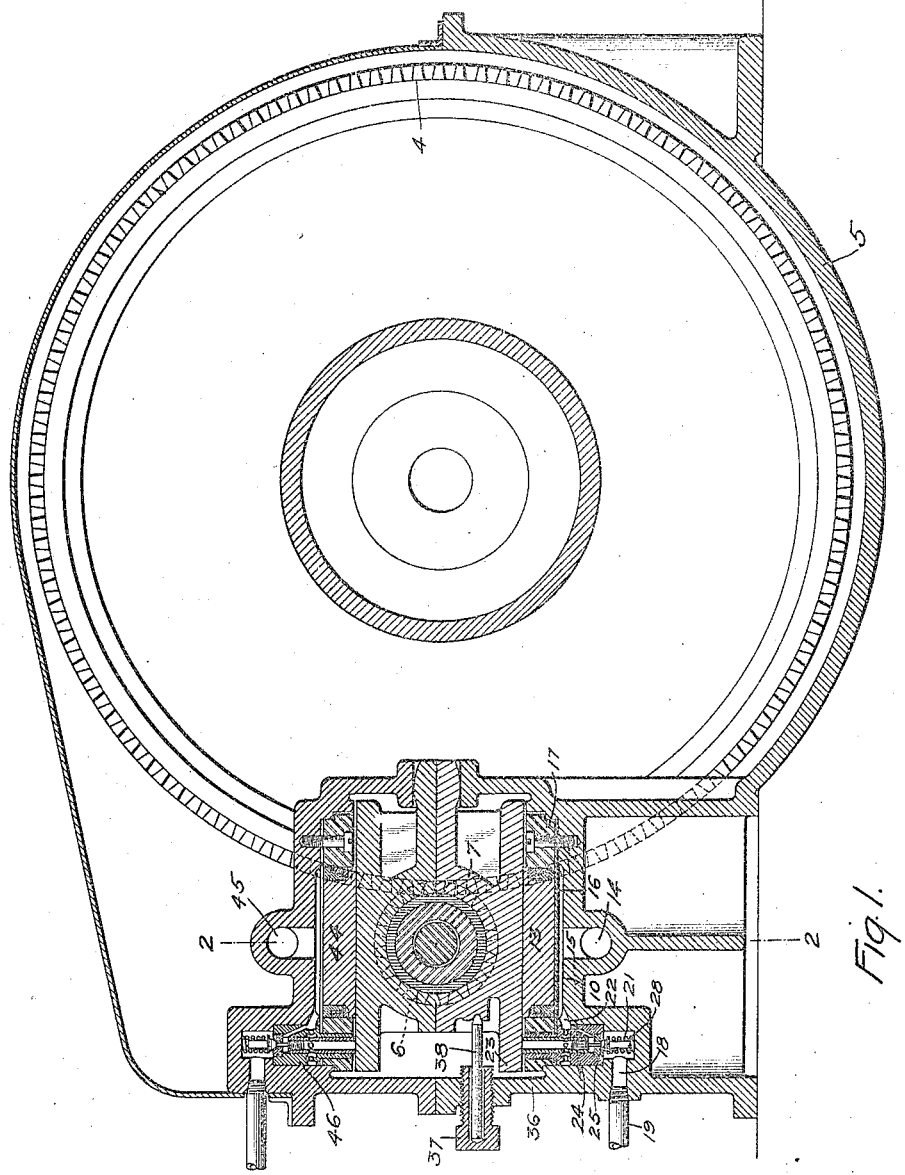

G. WESTINGHOUSE.
REDUCTION GEARING.
APPLICATION FILED JUNE 18, 1910. RENEWED JULY 23, 1913.

1,136,189.

Patented Apr. 20, 1915.
3 SHEETS—SHEET 3.

UNITED STATES PATENT OFFICE.

GEORGE WESTINGHOUSE, OF PITTSBURGH, PENNSYLVANIA, ASSIGNOR TO THE WESTINGHOUSE GEAR AND DYNAMOMETER COMPANY, A CORPORATION OF PENNSYLVANIA.

REDUCTION-GEARING.

1,136,189.  Specification of Letters Patent.  Patented Apr. 20, 1915.

Application filed June 18, 1910, Serial No. 567,616. Renewed July 23, 1913. Serial No. 780,814.

*To all whom it may concern:*

Be it known that I, GEORGE WESTINGHOUSE, a citizen of the United States, and a resident of Pittsburgh, in the county of Allegheny and State of Pennsylvania, have made a new and useful Invention in Reduction-Gearing, of which the following is a specification.

This invention relates to reduction gearing for transmitting power from high speed engines or motors to apparatus operating at lower speeds.

An object of this invention is to produce a reduction gearing in which means are employed for distributing and equalizing the pressure on the teeth of the gears employed.

A further object is to produce a reduction gearing in which means are employed for counterbalancing, by fluid pressure, the resultant strains due to the tooth pressure between the intermeshing gears and in which improved means are employed for permitting relative angular motion between the intermeshing gears employed.

A further and more specific object is to produce an accurate and effective means for varying the counterbalancing fluid pressure in accordance with variations of the tooth pressure.

Turbines operate most efficiently at relatively high speeds and ships' propellers operate most efficiently at relatively low speeds; consequently, in order to obtain the best efficiency when turbines are employed in marine propulsion, it is necessary to employ a reduction gearing between the turbine and the propeller. To this end, I have provided a driving member which may be connected to the turbine shaft and from which power may be delivered by the turbine to a more slowly revolving shaft by means of a pinion or pair of pinions which may be journaled in a floating frame and which intermeshes with a gear wheel or a pair of gear wheels. The floating frame is supported on the base frame or bed of the gearing device so that it is free to assume different positions both in a horizontal or a vertical plane for the purpose of adjusting the position of the pinion shaft relative to the shaft of the gears and of thereby equalizing the tooth pressure along the teeth and between the different sets of teeth of the intermeshing gears of the reduction gearing.

For the purpose of illustration, I have shown the device as consisting of a spur gearing including a gear and an intermeshing pinion in which the pinion is journaled in a fluid supported floating frame which permits the pinion to assume different angular positions relative to the gear in response to variations of tooth pressure encountered, whereby the pressures are proportionately distributed.

In the apparatus illustrated as an embodiment of my invention, the pinion is shown as having two sets of oppositely disposed spiral teeth and the gear likewise has two corresponding sets of spiral teeth. The floating frame of the pinion is supported on fluid actuated pistons so arranged that the fluid pressure employed to counterbalance the tooth pressure between the intermeshing gears is automatically controlled so that it varies with variations in the tooth pressure.

Further advantages, as well as novelty of construction, will be specifically described hereinafter, it being understood that changes in form, proportion, and minor details of construction may be resorted to without departing from the spirit of my invention or sacrificing any of its advantages.

Figure 2:
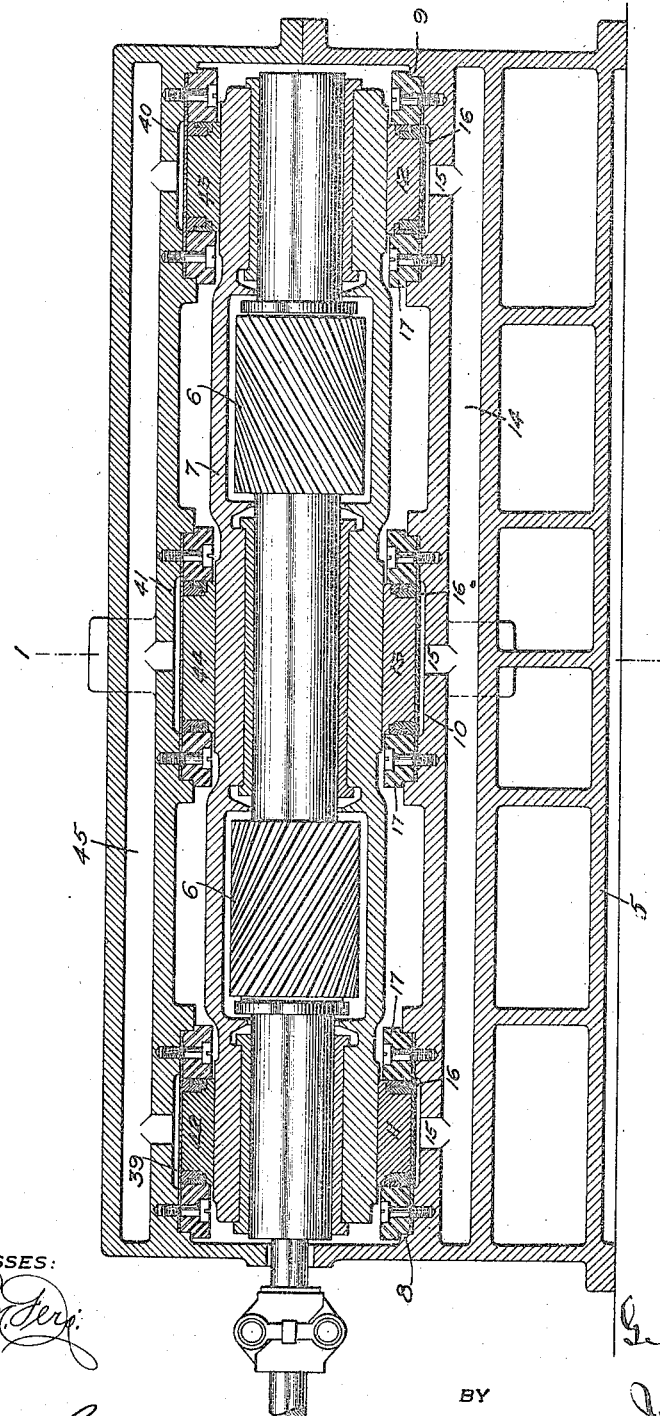
Figure 3:
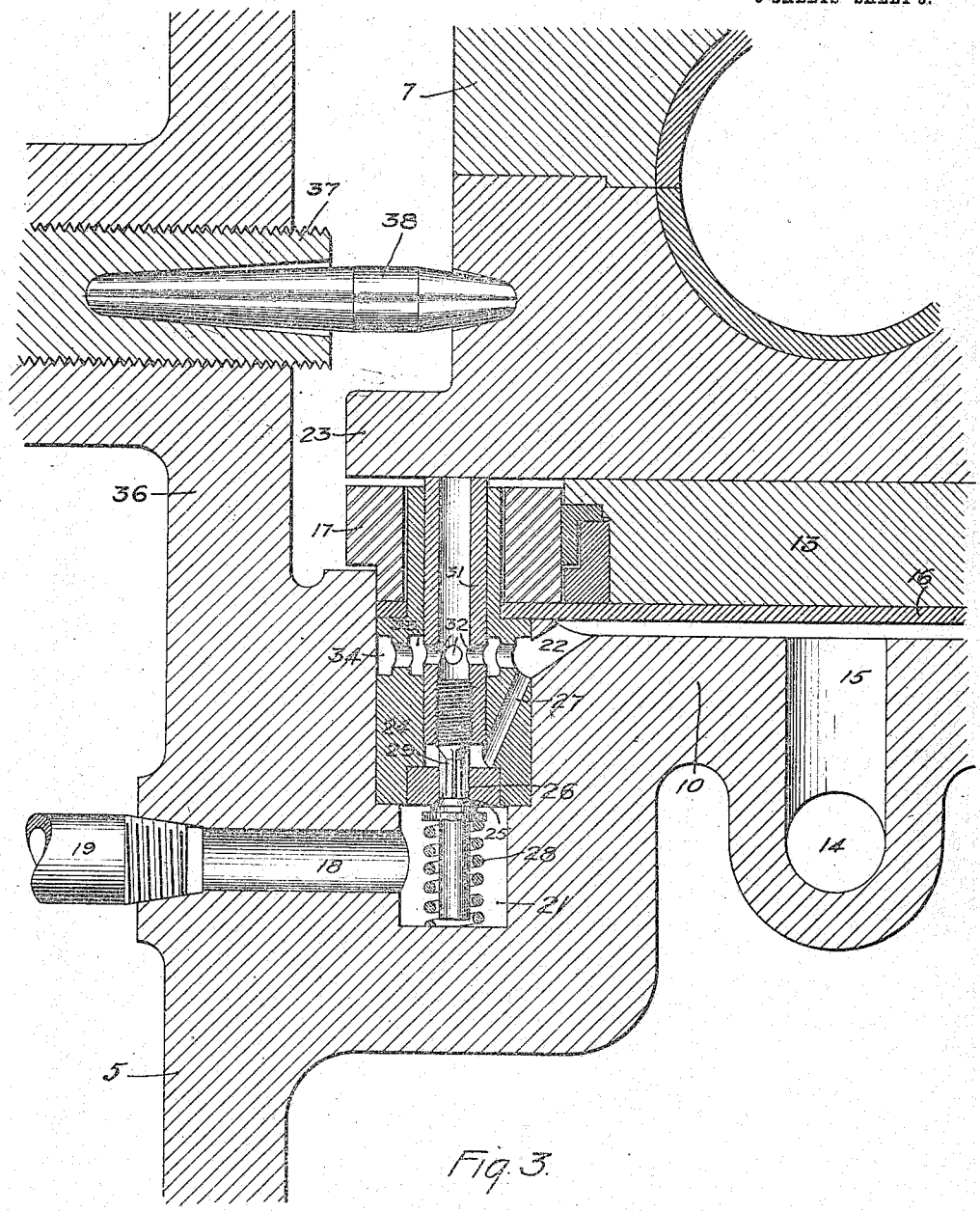

In the drawings accompanying this application and forming a part thereof, Figure 1 is a sectional view along the line 1—1 of Fig. 2 and shows the position of the fluid actuated supports, and pinion, the gear meshing therewith and a strut for holding the pinion and the gear in the proper operating relation. Fig. 2 is a sectional view along the line 2—2 of Fig. 1 and; Fig. 3 is a fragmental transverse section corresponding to Fig. 1 but on an enlarged scale, and shows a detail of my invention illustrated in Fig. 1.

Referring to the drawings: A gear 4 is journaled in a suitable frame or bed 5 and meshes with a pinion 6 journaled in a floating frame 7. The pinion 6 is mounted on a shaft which is adapted to be directly coupled to a turbine shaft and the gear 4 is mounted on a shaft which is adapted to be coupled to a propeller shaft or the shaft of any other apparatus to be driven. The base frame 5 is provided with a plurality of cylinders for supporting the floating frame 6. In the apparatus illustrated, six cylinders are employed, three above and three below the floating frame. Those designated by the numerals 8 and 9 are termed the end cylinders and the one designated by the numeral 10 is termed the intermediate cylinder. Pistons 11, 12 and 13 are mounted in the respective cylinders 8, 9 and 10 and support the floating frame 7. The cylinders are adapted to be supplied with any suitable fluid, as for example oil, through a passage 14 formed in a wall of the base frame 5 and connected with the inner end of each cylinder through a port 15. A diaphragm 16 is secured in place near the end of each cylinder by means of an annulus 17 which surrounds the respective piston of the cylinder and is secured in place on the base frame by means of suitable screws. Each diaphragm is located between the port 15 and the supporting piston of the frame 7 and the oil pressure is transmitted to the piston through the diaphragm.

The source of oil supply communicates with the passage 14 through a restricted orifice (not shown). The connecting ports 15 are of ample area so that the oil pressure in all the cylinders connecting with the passage 14 will be equalized through the passage and will be the same as the pressure in the passage.

The intermediate cylinder 10 connects with an auxiliary source of high pressure oil supply through an automatically actuated valve and is provided with a discharge or pressure equalizing port. High pressure oil is delivered to a passage 18 formed in a wall of the base frame 5 by a pipe 19. The passage 18 communicates with a counterbored recess 21 provided in the bed frame and which communicates with the cylinder 10 below the diaphragm 16 by means of a passage 22. Direct communication between the passage 18 and the cylinder 10 is, however, cut off by means of a valve mechanism which is actuated by a flange 23 of the floating frame 7.

The valve mechanism includes a bushing 24 which is located in the recess 21 and on the inner end of which a valve 25 seats to close a port 26 provided in the inner end of the bushing. The port 26 and a passage 27 form a means of communication between the passage 18 and the cylinder 10. The valve is held to its seat by means of a coiled spring 28 and is provided with a stem 29 which extends upwardly through the port 27 and is secured to a tubular member 31 slidably mounted in the bushing 24 and projecting beyond the bushing at its upper end. The stem 29 closes the lower end of the tubular member 31, the upper end, however, is open and provides a discharge or equalizing passage for the cylinder 10. Radially extending holes 32 are formed in the member 31 and communicate with its interior and with an annular passage 33 formed in the bushing. The passage 33 communicates with the passage 22 through a series of radial passages and annular passage 34 formed in exterior face of the bushing.

The flange 23 of the floating frame 7 is capable of closing the upper end of the member 31 and of reciprocating the member to control the operation of the valve 25. With this arrangement variations in the tooth pressure between the gear and the pinion or variations in the position of the floating frame are capable of varying the pressure in the cylinder 10 and consequently in the cylinders 8 and 9.

When the pinion 6 is driven in a counter clockwise direction (Fig. 1) the tooth pressure between the intermeshing teeth will tend to force the floating frame downwardly in opposition to the oil pressure in the cylinders below the frame and, if this downward resultant of the tooth pressure preponderates over the effect of the oil pressure in all the cylinders, the floating frame will move the pistons 11, 12 and 13 down until the flange 23 of the floating frame, by depressing the tubular member 31, opens the valve 25 and admits high pressure oil from the pipe 19 through the port 26 and the passages 27 and 22 into the cylinder 10. By admitting high pressure oil in this manner to the cylinder 10, the pressure in the passage 14 and in its connecting cylinders is increased. When the pressure has increased to such an extent that it preponderates over the tooth pressure, the pistons 11, 12 and 13 will raise the floating frame and as a result the valve 25 will be moved up by the coil spring 28 to close the port 26 and cut off the supply of high pressure oil. If the oil pressure in the cylinders still preponderates over the downward resultant of the tooth pressure, the piston will continue to raise the floating frame 7 until the flange 23 leaves the upper end of the member 31 and permits oil to discharge from the cylinder 10 through the passage 22, the annular passages 33 and 34 and the tubular member 31. This discharge of oil from the upper end of the member 31 will of course be very gradual and at first very much restricted so that the oil pressure in the cylinders will be gradually decreased until it no longer preponderates over the resultant tooth pressure and a condition of equilibrium is obtained. When the tooth pressure again preponderates the frame 7 will move down, first to close the upper end of the member 31 and shut off the discharge of oil from the cylinder 10 and if the oil pressure in the cylinders is not then sufficiently increased to counteract the tooth pressure the frame will continue to move down until the valve 25 is again opened and the high pressure oil is again admitted to the system of hydraulic cylinders communicating with the passage 14. The movement of the frame 7 necessary to effect this regulation is very small and has no detrimental effect on the operation of the reduction gearing.

The cross sectional areas of the end cylinders 8 and 9 are equal, while, in the apparatus illustrated, the cross sectional area of the intermediate cylinder is about twice the area of either of the end cylinders since a greater pressure resulting from the tooth pressure will be encountered at this point. The effective areas of the cylinders and the oil pressure employed are so proportioned that the pistons are never moved sufficiently to strain the diaphragms 16 and the frame 7 is always supported by hydraulic or fluid pressure.

If for any reason the tooth pressure between the intermeshing sets of teeth located at the right hand end of the reduction gearing (Fig. 2) would tend to exceed that between the intermeshing teeth at the other end of the gearing, the piston 12 would tend to support a greater load than the piston 11. This, of course, is impossible with the hydraulic system employed and the end pistons instead of assuming different loads will adjust the load equally between themselves by changing their positions and in this manner the tooth pressure at each end of the gearing will be equalized. The same result would be obtained if the teeth extended the entire length of the pinion and the gears and the tooth pressure would be equalized along the length of the teeth.

In order to prevent horizontal angular movement in a plane perpendicular to the plane of the axes of the pinion, I have provided, as illustrated in Fig. 1, a strut, of which there may be any suitable number, projecting through a wall 36 of the base frame 5. The strut may conveniently consist of a hollow threaded member 37 adapted to receive a bar or pin 38 which engages a slot or depression provided on the floating frame 7. The member 37 is threaded exteriorly to engage interior threads in the wall 36 so that a micrometer adjustment may be made and the floating frame be so adjusted with respect to the gear that a proper engagement of the teeth of the pinion and the gear will be maintained and at the same time, the vertical and the angular movement of the pinion with respect to the remaining parts will not be retarded.

I have thus far described the reduction gearing as being adapted for a pinion which turns in a counter-clockwise direction. Under some conditions, as in marine propulsion it is desirable to reverse the propeller and consequently the turbine or motor driving the reduction gearing. Under such conditions the pinion 6 would rotate in a reverse direction to that just described or in a clockwise direction. In order to cushion and distribute the stresses set up by the upward resultant of the tooth pressure while the pinion is revolving in a clockwise direction I have provided a series of cylinders and pistons similar to those heretofore described. These cylinders I have designated by the reference numerals 39, 40 and 41 and they are respectively provided with pistons 42, 43, and 44 and are in other respects similarly constructed and are operated in precisely the same way as those described. Oil under pressure is delivered to these cylinders through a passage 45 and the oil pressure in this hydraulic system is regulated by a valve mechanism 46 which corresponds in all respects to the valve mechanism described in connection with the cylinder 10. It will be apparent that the floating frame will be held between the upper and lower sets of pistons and that it will practically float upon a body of fluid so that the strains transmitted through the gearing will be taken up by the fluid in the respective cylinders and that the pressures will be properly distributed between the different bodies of fluid.

Having thus described my invention, what I claim is—

1. In a reduction gearing, intermeshing gears, fluid actuated supporting means constructed to allow relative angular motion between said gears, means for delivering actuating fluid to said supporting means, and means responsive to variations of tooth pressure for admitting an auxiliary supply of fluid to said supporting means.

2. In a reduction gearing, intermeshing gears, fluid actuated supports arranged to permit relative angular motion between said gears, means for delivering actuating fluid to said supports, and means for admitting auxiliary high pressure fluid to said supports.

3. In a reduction gearing, intermeshing gears, fluid actuated supporting pistons constructed to allow relative angular motion between said gears, means for delivering actuating fluid to said supports, and means responsive to variations of tooth pressure between said gears for delivering variable amounts of auxiliary high pressure fluid to said pistons.

4. In a reduction gearing, intermeshing gears, a cylinder, a fluid actuated piston located in said cylinder for supporting one of the intermeshing gears, means for admitting a constant supply of fluid to said cylinder, and means responsive to variations of tooth pressure between said intermeshing gears for admitting an auxiliary supply of fluid to said cylinder and for discharging fluid therefrom.

5. In a reduction gearing, intermeshing gears, fluid cylinders, fluid actuated supporting means located in said cylinders and arranged to allow relative angular motion between said gears, a source of fluid supply for said cylinders, a source of high pressure fluid supply and a valve mechanism operating in response to variations of tooth pressure between said intermeshing gears for admitting fluid from said high pressure source of supply to said cylinders and for discharging fluid from said cylinders.

6. In a reduction gearing, intermeshing gears, a floating frame for one of said gears, a system of fluid pressure cylinders, fluid actuated supporting means for said frame within said cylinders, a source of fluid supply for said cylinders, a source of high pressure fluid supply, and a valve mechanism actuated by said floating frame for admitting fluid from said high pressure source to said cylinders and for discharging fluid from said cylinders.

7. In a reduction gearing, intermeshing gears, a fluid cylinder, a support piston located in said cylinder and movable at an angle to the axis of the fluid supported gear, a source of fluid supply for said cylinder, and a diaphragm between said piston and said source of fluid supply.

8. In a reduction gearing, intermeshing gears, a frame carrying one of said gears, two or more diaphragms, and means utilizing fluid under pressure for causing said diaphragms to support said frame.

9. In a reduction gearing, intermeshing gears, a floating frame for one of said gears, and a fluid actuated diaphragm for supporting said frame so that it is movable at an angle to the axis of the gear it supports.

10. In a reduction gearing, intermeshing gears, a floating frame for one of said gears, fluid actuated diaphragms for supporting said frame, and means responsive to variations of tooth pressure between said gears for delivering variable amounts of high pressure fluid to said diaphragm.

11. In combination with a pair of coöperating gears, a frame carrying one of said gears free to move at an angle to the axis of said gear and fluid supporting means, including a diaphragm, for supporting said frame.

12. In combination with a pair of coöperating gears, a frame carrying one of said gears, fluid-actuated means employing a diaphragm for supporting said frame, and means for automatically controlling the pressure of said fluid.

13. In combination with a pair of coöperating gears, a frame in which one of said gears is journaled, two or more diaphragms beneath said frame and adjacent its ends, and a fluid pressure system common to said diaphragms and so arranged that said diaphragms are caused to support said frame.

14. In a reduction gearing, a gear, a pinion meshing therewith, a frame, bearings in said frame for said pinion, two or more diaphragms beneath said frame, and a fluid pressure system common to said diaphragms and so arranged that the fluid by means of said diaphragms is caused to float said frame for automatically distributing the tooth pressures encountered.

15. In a transmission gearing, intermeshing gears, means for confining a plurality of relatively thin liquid films for movably supporting one of said gears.

16. In a transmission gearing, intermeshing gears, a plurality of relatively thin liquid films for supporting one of said gears, means for confining said films and means for supplying liquid under pressure to said films.

17. In a transmission gearing, intermeshing gears, means on which one of said gears is journaled movable at an angle to the axis of the other gear to equalize tooth pressures along the gears, relatively thin liquid films for supporting said means, and means for delivering liquid under pressure to said films.

18. In a transmission gearing, intermeshing gears, a plurality of relatively thin liquid film supported bearings for one of said gears, and means for delivering liquid under pressure to each of said bearings.

19. In a transmission gearing, intermeshing gears, means for supporting one of said gears by a number of relatively thin oil films.

20. In a transmission gearing, intermeshing gears, means for supporting one of said gears by a number of relatively thin oil films, and means for limiting the relative angular motion of the gears to the plane which includes the axis of the relatively movable gear and is perpendicular to the plane including the axes of both of the gears when they are in their normal positions.

21. A transmission gearing comprising intermeshing gears, a frame on which one of said gears is mounted, pressure actuating means for movably supporting said frame, and a valve controlled by variations in the position of said frame for varying the actuating pressure of said means.

22. A transmission gearing comprising intermeshing gears, pressure actuated supporting means for movably supporting one of said gears, a valve for varying the actuating pressure of said means, and means responsive to variations in tooth pressure for controlling the operation of said valve.

23. In a transmission gearing, intermeshing gears, a frame on which one of said gears is journaled pressure actuated supporting means for the frame constructed to allow relative angular motion between the gears, and a valve actuated by variations in position of said frame for varying the actuating pressure of said supporting means.

24. A transmission gearing comprising intermeshing gears, a frame on which one of said gears is journaled, a plurality of pressure actuated devices for movably supporting the frame, means for transmitting actuating fluid of equal pressure to each of said devices, and a valve responsive to variations in tooth pressure for simultaneously varying the actuating pressure of each of said devices.

25. In a transmission gearing, intermeshing gears, a frame on which one of said gears is journaled, a plurality of supporting devices so constructed and arranged as to allow relative angular motion between the gears, means for delivering supporting liquid to said devices, and means responsive to variations in tooth pressure between said gears for simultaneously subjecting said devices to an auxiliary supporting pressure.

26. A transmission gearing comprising intermeshing gears, a frame on which one of said gears is journaled, two oppositely located fluid pressure actuated devices between which said frame is mounted, said devices being constructed and arranged to allow relative angular motion between said gears, and means responsive to variations in tooth pressure for admitting an auxiliary supply of fluid to one device or the other.

27. In a transmission mechanism, intermeshing gears, a frame on which one of said gears is journaled, oppositely acting fluid pressure supporting means for supporting said frame, means for delivering supporting liquid to said devices and means responsive to variations in tooth pressure for admitting an auxiliary supply of fluid under pressure to said supporting means to counterbalance strains in either direction occasioned by tooth pressure between the gears.

28. In a transmission mechanism, intermeshing gears, a frame on which one of said gears is journaled, two sets of oppositely acting pressure actuated pistons between which said frame is mounted, and means responsive to variations in the position of said frame for delivering an auxiliary supply of actuating fluid to one or the other set of pistons to counterbalance strains in either direction occasioned by tooth pressure between said gears.

29. In a transmission mechanism, intermeshing gears, a frame on which one of said gears is mounted, two sets of oppositely operating supporting means for said frame, a separate fluid pressure system common to the means of each set, and a separate valve communicating with each system and actuated by variation in position of said frame for delivering an auxiliary supply of fluid to each of said systems.

30. In a transmission gear, intermeshing gears, a plurality of separate relatively thin liquid films for supporting one of said gears so that it is movable at an angle relatively to the axis of the other gear, and a liquid distribution system in open communication with each of said films.

31. In a transmission gearing, intermeshing gears, means for supporting one of said gears so that it is movable at an angle relatively to the other, means for maintaining a relatively thin film of liquid under pressure for supporting said first mentioned means, and a liquid distribution system in communication with said film.

32. In a transmission gearing, intermeshing gears, means for supporting one of said gears so that it is movable at an angle relatively to the other, means for maintaining a relatively thin film of liquid under pressure for supporting said first mentioned means, and struts for limiting the motion of said movably supported gear to a plane substantially at right angles to the plane defined by the normal positions of the axes of the gears.

33. In a transmission gearing, intermeshing gears, fluid actuated supporting means constructed to allow relative angular motion between said gears, means for maintaining a relatively thin film of confined liquid for supporting said first mentioned means, and means responsive to variations of tooth pressure for varying the pressure exerted by said film.

34. In a transmission gearing, intermeshing gears, pressure actuated means for movably supporting one of the gears so that it is movable at an angle relatively to the axis of the other gear, and a valve responsive to variations in tooth pressure between the gears for controlling the actuating pressure of said supporting means.

35. A transmission gearing comprising intermeshing gears, a plurality of pressure actuated devices for movably supporting one of said gears so that it is capable of moving at an angle to the axis of the other gear, means for transmitting actuated fluid of equal pressure to each of said devices, and a valve responsive to variations in the position of said supported gear for varying the actuating pressure transmitted to said devices.

36. In a transmission gearing, intermeshing gears, a plurality of supporting devices for one of said gears so constructed and arranged as to allow relative angular motion between the gears, means for delivering actuating pressure to said devices, means responsive to variations in tooth pressure between said gears for simultaneously subjecting said devices to an auxiliary supporting pressure, and struts for limiting the angular motion of said movably supported gear.

37. A transmission gearing comprising intermeshing gears, two oppositely located fluid pressure actuated devices between which one of said gears is mounted, said devices being constructed and arranged to allow relative angular motion between said gears, means for admitting actuating fluid to said devices, and means responsive to variations in the position of the supported gear for admitting an auxiliary supply of fluid to one or the other of said devices.

38. In a transmission gearing, a liquid film supported gear capable of moving at an angle to the axis of its coöperating gear, relatively thin liquid films for supporting the angularly movable gear, means for confining the supporting films of liquid, and means for delivering liquid to said film confining means.

39. In a transmission gearing, intermeshing gears, movable bearings for one of said gears so that it is capable of angular movement relatively to the axis of the other gear, and flexible diaphragms for supporting said bearings.

40. In a transmission gearing, intermeshing gears, movable bearings for one of said gears so that the gear is movable at an angle relatively to the axis of the other gear, and resilient supports for said bearings.

41. In a transmission gearing, intermeshing gears, movable bearings for one of said gears so that it is movable at an angle relatively to the axis of the other gear, resilient supports for said bearings, and means for augmenting the supporting force of each of said supports by fluid pressure.

42. In a transmission gearing, a gear, flexible diaphragms, a pinion meshing with the gear and supported at intervals along its length by said flexible diaphragms whereby said pinion is movable at an angle relatively to the axis of said gear.

43. In a transmission gearing, a pinion, a floating frame on which said pinion is journaled, flexible diaphragms for supporting said frame located at intervals longitudinally along the frame, and means for augmenting the supporting force of said diaphragms by fluid pressure.

44. In a transmission gearing, intermeshing gears and a plurality of flexible supports for one of said gears spaced one from the other longitudinally along the gear whereby said gear is movable at an angle relatively to the axis of the other gear.

45. In a transmission gearing, intermeshing gears, a movable support for one of said gears, resilient supports for said movable support located on each side of the support and spaced therealong axially with relation to the supported gear.

46. In a transmission gearing, intermeshing gears, a movable support for one of said gears, resilient supports between which said movable support is located, and a liquid backing for the resilient supports.

47. In a transmission gearing, intermeshing gears, a movable support for one of said gears, and flexible diaphragms for supporting said movable support, said diaphragms being located on opposite sides of said movable support and spaced axially with relation to the gear supported thereby.

48. In a transmission gearing, intermeshing gears, a movable support for one of said gears, two sets of resilient supports for supporting the movable support and between which the movable support is located, and means for augmenting each resilient support by means of liquid under pressure.

49. In a transmission gearing, intermeshing gears, spring supports for one gear located on opposite sides thereof, whereby said gear is movable relatively to the other gear and in a plane substantially perpendicular to a plane defined by the normal positions of the axes of the gears, and means for subjecting the spring supports to the action of a confined liquid.

50. In a transmission gearing, intermeshing gears, two separate spring supports for one of said gears located on opposite sides of the gears whereby the spring supported gear is movable angularly with relation to the axis of the other gear.

51. In a transmission gearing, intermeshing gears, spring plate supports for one of said gears spaced axially with relation to the gear supported thereby.

52. In a transmission gearing, intermeshing gears, bearing for supporting one of said gears so that it is movable at an angle to the axis of the other gear to equalize tooth pressures along the gears, and a spring plate support for one of said bearings disposed in a plane substantially parallel to the plane defined by the normal positions of the axes of both of the gears.

In testimony whereof, I have hereunto subscribed my name this 15th day of June, 1910.

GEO. WESTINGHOUSE.

Witnesses:
C. W. McGhee,
E. W. McCallister.

It is hereby certified that in Letters Patent No. 1,136,189, granted April 20, 1915, upon the application of George Westinghouse, of Pittsburgh, Pennsylvania, for an improvement in "Reduction-Gearing," errors appear in the printed specification requiring correction as follows: Page 6, line 91, for the word "gears" read *gear;* same page, line 99, for the word "bearing" read *bearings;* and that the said Letters Patent should be read with these corrections therein that the same may conform to the record of the case in the Patent Office.

Signed and sealed this 8th day of June, A. D., 1915.

[SEAL.]

R. F. WHITEHEAD,
*Acting Commissioner of Patents.*